Jan. 28, 1936.  J. H. SHERTS  2,028,927
APPARATUS FOR MAKING LAMINATED GLASS
Filed Feb. 17, 1934   4 Sheets-Sheet 2
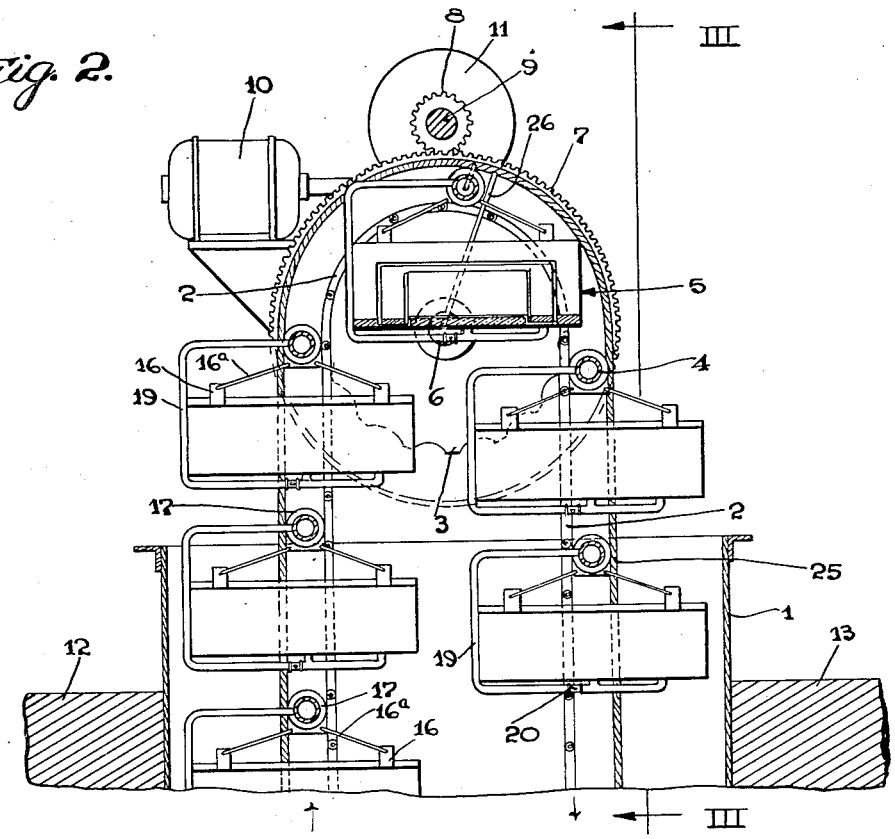
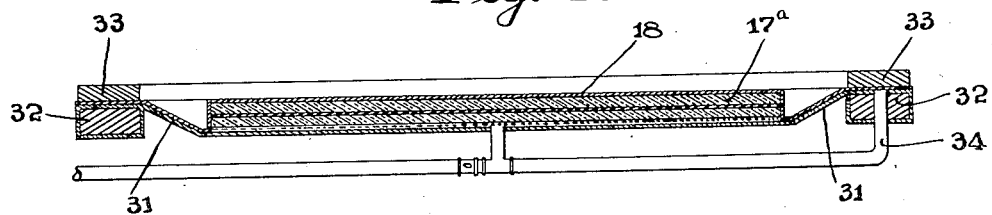
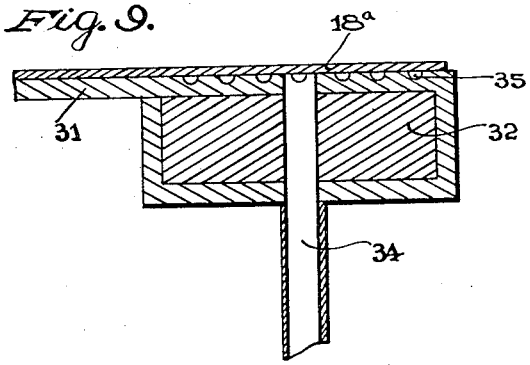
INVENTOR
JAMES H. SHERTS
BY
ATTORNEYS.

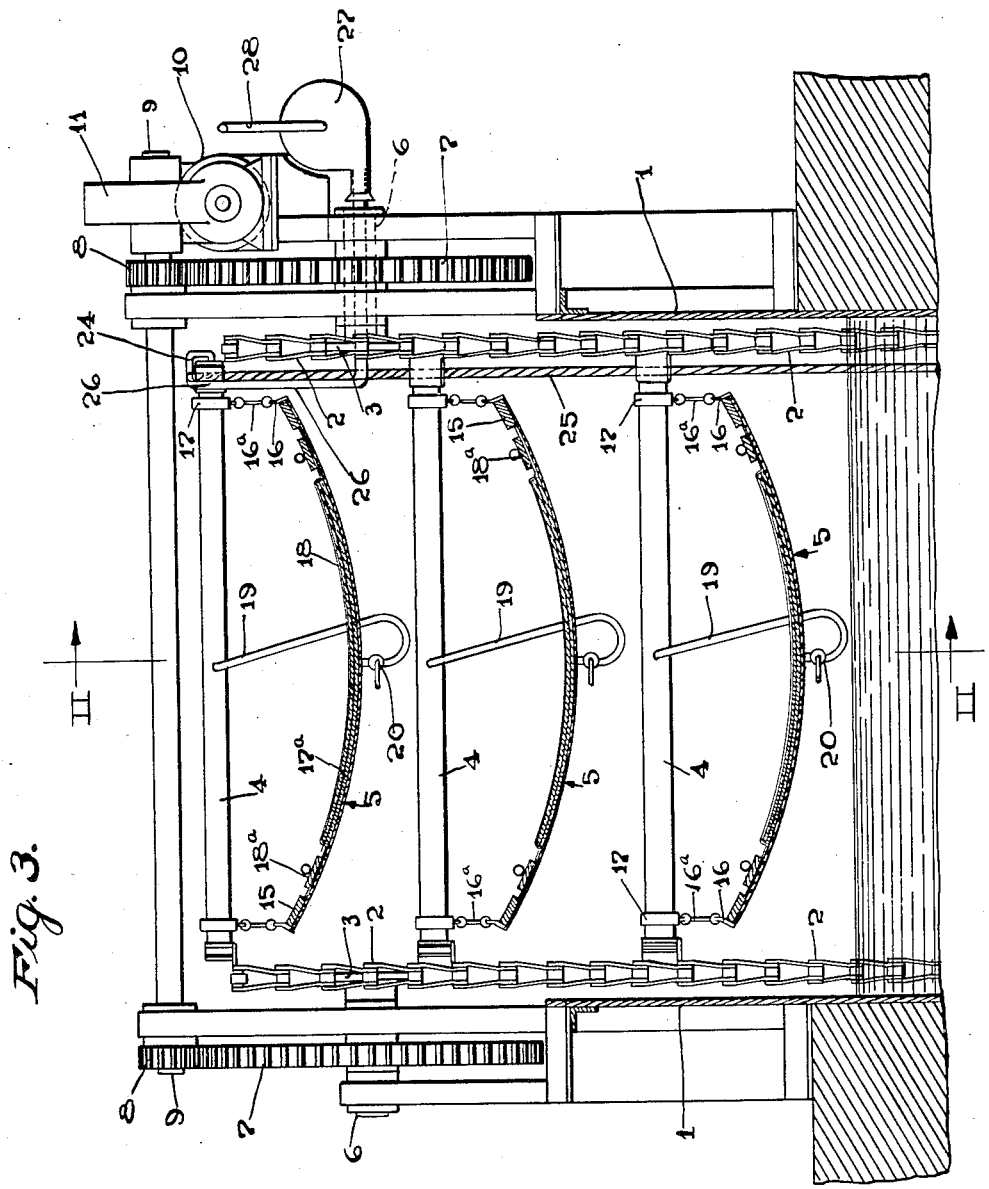

Jan. 28, 1936.  J. H. SHERTS  2,028,927
APPARATUS FOR MAKING LAMINATED GLASS
Filed Feb. 17, 1934  4 Sheets-Sheet 4
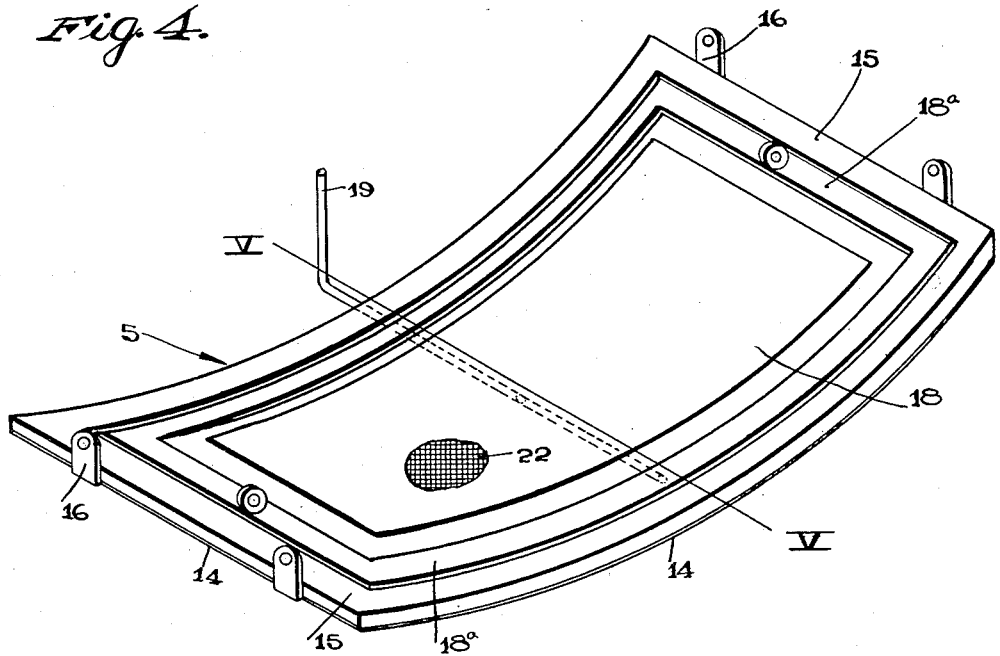
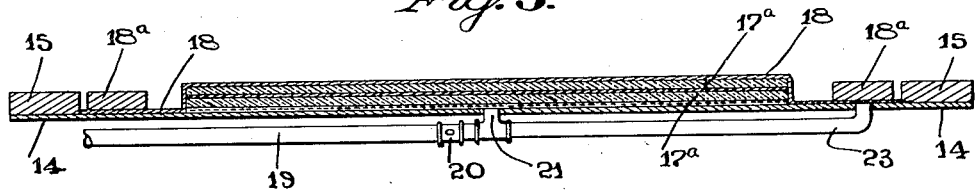
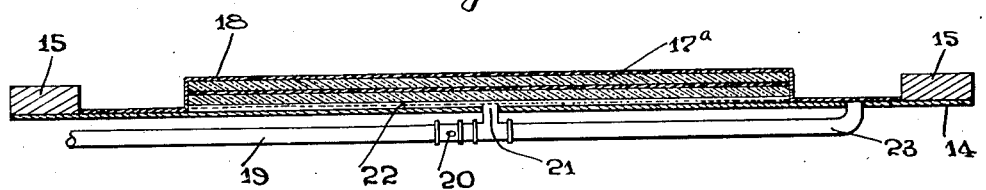
INVENTOR
JAMES H. SHERTS.
BY
ATTORNEYS.

Patented Jan. 28, 1936

2,028,927

UNITED STATES PATENT OFFICE 2,028,927

APPARATUS FOR MAKING LAMINATED GLASS

James H. Sherts, Tarentum, Pa., assignor to Duplate Corporation, a corporation of Delaware Application February 17, 1934, Serial No. 711,726

5 Claims. (Cl. 18—17)

The invention relates to apparatus for making laminated or safety glass which ordinarily comprises two sheets of glass cemented to the opposite sides of a sheet of reinforcing material, such as cellulose nitrate plastic (celluloid) or cellulose acetate plastic. The apparatus comprises a development of the apparatus of my Patent 1,905,189, dated April 25, 1933, and is designed particularly for laminating curved plates although applicable in the manufacture of flat safety glass. It has for its principal object the provision of improved apparatus adapted to handle plates of different curvature. A further object is the provision of improved means for exhausting the air from the areas in which the sheets of material are carried preliminary to and during the compositing operation. Certain embodiments of the invention are illustrated in the accompanying drawings, wherein:

Figure 1 is a diagrammatic vertical section through the complete apparatus; Fig. 2 is a vertical section through the upper portion of the apparatus on the line II—II of Fig. 3; Fig. 3 is a section on the line III—III of Fig. 2; Figs. 4 and 5 are detail views of one of the carriers or pans, Fig. 4 being a perspective view and Fig. 5 a section on the line V—V of Fig. 4; Figs. 6 and 7 are sections similar to Fig. 5 through modified forms of pans. Figs. 8 and 9 are sectional views showing a modification, Fig. 9 being an enlargement of one end of the construction shown in Fig. 8. And Figs. 10 and 11 are detail views of the air connections.

Referring to the drawings, and particularly to Fig. 1 which shows the general arrangement of the complete apparatus, 1 is a vertical tank of considerable depth which carries a body of liquid for performing the pressing operation, such liquid preferably being a high boiling solvent such as diethylene glycol. Mounted for movement through the tank is an endless conveyor in the form of the chains 2, 2 which pass around suitable sprockets 3, 3 at their upper ends, and are provided with a plurality of transverse pipes 4, 4, 4, etc., which are secured at their ends to the chains and act as supports for the carriers or pans 5, 5, 5, etc., which support the sets of glass and plastic sheets which are to be laminated. The sprockets 2, 2 are mounted upon the shafts 6, 6 (Fig. 3), and such shafts also carry the spur gears 7, 7 which are driven from the pinions 8, 8 on the shaft 9. The shaft 9 is driven from the electric motor 10 through the intermediary of worm reducing gearing in the casing 11. In operation the chains 2, 2 are driven in the direction of the arrows as indicated in Figs. 1 and 2, the pans or carriers are loaded with the sets of sheets to be laminated from the platform 12 at the left side of the tank, and are removed from such pans at the station 13 on the right hand side of the tank. The sets of sheets to be laminated are thus exposed to heat and pressure due to the liquid in the tank while the carriers are descending through the length of the tank on the left hand side thereof and also during the period in which they are moving upward vertically on the right hand side of the tank to the station 13.

The construction of the carriers or pans will be seen by reference to Figs. 4 and 5. The base plate 14 is bent to the curvature of the glass sheets to be laminated and comprises a thin sheet of metal, such as aluminum, copper or steel, and a rectangular frame 15 of iron or steel is secured to the plate 14 by welding or riveting. The base plate as thus provided is sufficiently stiff to retain its curvature while in service, and at the same time has enough flexibility to permit it to be bent to any desired curvature to suit the curvature of the glass sheets to be laminated. The metal is substantially without temper so that it holds the shape to which it is bent. This feature of construction avoids the requirement for a large number of pans of different curvature, which meets the requirement in practice of laminating glass sheets which have many different curvatures. The base plate may be readily bent to any desired curvature to fit a template which corresponds in curvature to that of the glass sheets to be laminated. Each base plate is provided with four (4) supporting lugs 16 from which links 16a extend to the collars 17 on the pipes 4, the collars 17 being swiveled on the pipes 4 so that when the pans are in operative position, as indicated in Figs. 1, 2 and 3, they maintain their position transverse of the vertical line of movement of the chains during their up and down movement through the tank. Under these conditions there is no tendency of the sheets which are being laminated to move relative to each other or to their carriers during the laminating operation, as would be the case if the carriers or pans are supported edgewise instead of flatwise.

After the set of sheets 17a (consisting of two sheets of glass with an interposed sheet of cellulose plastic) have been positioned upon the base plate 14, the flexible rubber sheet 18 is applied, as indicated in Fig. 5 and a rectangular holding-down frame 18a is placed over the edges of the sheet so as to seal the edges of the sheet with respect to the base plate. As is well known in the art, it is desirable to exhaust the air from the space carrying the sandwich 17a and in order to accomplish this purpose a vacuum pipe 19 is provided having a cock 20 and leading through the base plate 14, as indicated at 21. In order that the lower of the glass sheets may not seal the opening through which the connection 21 leads, a sheet of metal gauze 22 is preferably interposed between the surface of the plate 14 and the lower face of the glass sheet. Further, in order to insure against leakage beneath the edge of the rubber sheet 18, the vacuum pipe 19 is extended, as indicated at 23 and passes through the base plate 14 so that suction is applied between the plate 14 and the edge of the rubber sheet 18. The application of this vacuum seal at the edge of the rubber sheet in connection with the holding-down frame 18a insures that there will be no leakage of liquid into the space carrying the sandwich, or any substantial loss of vacuum during the operation of carrying the pan and its contents through the pressing liquid. The vacuum pipe 19 leads into the pipe 4, as indicated in Fig. 3, and air is exhausted from all of the pipes 4 by means of the swivel connections 24 which have their outer ends connected to the flexible header pipe 25, which is endless, and has a connection, as above described, to each of the pipes 4. The air is exhausted from the pipe 25 by means of a flexible pipe 26 swiveled at one end to the pipe 25 and passing through the shaft 6, which is hollow, and around a spring reel in the casing 27. The reel has a hollow axle to which the pipe 26 is connected and connected to such axle is a pipe connection 28 leading to suitable exhaust device (not shown). In this manner provision is made for exhausting air from the spaces carrying the sandwiches of the various pans and maintaining such exhaust during the period in which the pans are carried through the liquid of the pans. The cocks 20 in the pipes 19 prevent a loss of vacuum from the system when the pans are being loaded and unloaded.

In preparing the sheets for lamination, the faces of the glass sheets which are to go next to the plastic sheet are preferably coated with a cement, after which the sheets are assembled in the pans, as heretofore described, and passed through the pressing liquid, which softens the cement and plastic and causes the sheets to adhere together. The apparatus is preferably used in what is known as preliminary pressing, in that the sheets are stuck together rigidly so as to seal the joints, but not pressed to an extent sufficient to make commercial safety glass, the final pressing being accomplished in the usual way in a hydraulic press in which the plates are exposed to direct contact with the liquid of the tank, as set forth in Sherts and Hamill Patent No. 1,781,084 dated Nov. 11, 1930. The temperature to which the sheets are exposed in the tank 1 may range from 200 to 250 degrees F. and the pressure may range from ten pounds up, it being understood that the conditions of temperature and pressure will vary in accordance with the cement used and the type of reinforcing plastic which is employed.

Fig. 7 illustrates a modification in which the base plate 29 is of sheet metal somewhat heavier than the plate 14 of the Fig. 6 construction, and in this form of pan no reinforcing frame similar to the frame 15 of Fig. 6 is employed, the plate 29 being sufficiently stiff to maintain its shape without any reinforcing frame. As in the first type of construction, the supporting plate is stiff enough to maintain its shape, but at the same time may be bent to any desired contour to suit the contour of the plates which are to be laminated. As in the first type of construction a holding-down frame 18a for the edges of the rubber sheet 17 is employed in order to reduce the tendency to leakage from and to the space carrying the sandwich.

Fig. 8 illustrates a further modification in which the base plate consists of a sheet of rubber 31 supported upon an edgeframe 32, which corresponds in function to the edgeframe 15 of the Fig. 6 construction. A holding-down frame 33 is employed for clamping the edge of the rubber sheet 18, this construction in other respects following that of the ones heretofore described. Fig. 9 shows the construction employed for exhausting the air from beneath the edge of the rubber sheet 17. The exhaust pipe 34 extends through the frame 32 and is connected to the vacuum grooves 35. In each form of construction the base plate in conjunction with the rubber sheet constitutes a container corresponding in function to the rubber bags heretofore used in laminating safety glass, and if desired, just as in the rubber bag operation, the air may be exhausted from the containers before they are placed on the conveyor, and the continuous exhaust system dispensed with; but the continuous exhaust system has the advantage that a partial vacuum is maintained even though leakage should occur between the base plate and the rubber cover sheet.

What I claim is:

1. In apparatus for making laminated glass, a vertical tank containing a body of heated liquid, an endless conveyor movable vertically into the bath and then upward and out of such bath, a carrier for the sheets to be laminated comprising a base plate having a curvature corresponding to that of the sheets to be laminated pivotally supported on the conveyor so that the plate lies transverse to the line of movement of the conveyor during the movement of the conveyor through the bath, a flexible cover fitting over the sheets carried upon the plate and means for exhausting the air from the space between the plate and cover.

2. In apparatus for making laminated glass, a vertical tank containing a body of heated liquid, an endless conveyor movable vertically into the bath, a carrier for the sheets to be laminated comprising a base plate having a curvature corresponding to that of the sheets to be laminated pivotally supported on the conveyor, a spring reel above the tank, a flexible tube carried by the reel and connected to the space between the plate and the cover, and exhaust means connected to the tube.

3. In combination in apparatus for making curved laminated plates, a curved base plate for supporting the sheets to be laminated of flexible construction so that it may be bent to any desired curvature, but of sufficient stiffness to maintain the shape to which it is bent, a flexible cover adapted to fit over the sheets carried upon the plate and to engage the surface of such plate outward of the edges of the sheets, and means for exhausting the air from the space between the base plate and cover, said cover having its edges unattached to the plate so, that it may be moved into and out of position in applying and removing the sheets from the base plate.

4. In combination in apparatus for making curved laminated plates, a curved base plate for supporting the sheets to be laminated of sheet metal which may be bent to any desired curvature, but of sufficient stiffness to maintain the shape to which it is bent, a flexible cover adapted to fit over the sheets carried upon the plate outward of the edges of the sheets, and means for exhausting the air from the space between the base plate and cover, said cover having its edges unattached to the plate, so that it may be moved into and out of position in applying and removing the sheets from the base plate.

5. In combination in apparatus for making curved laminated plates, a curved base plate for supporting the sheets to be laminated of flexible construction so that it may be bent to any desired curvature, but of sufficient stiffness to maintain the shape to which it is bent, a flexible cover adapted to fit over the sheets carried upon the plate and to engage the surface of such plate outward of the edges of the sheets, a removable frame resting upon the edges of the cover, and means for exhausting the air from the space between the base plate and cover, said cover having its edges unattached to the base plate, so that after the removal of said frame the cover is free to be moved into and out of position in applying and removing the sheets from the base plate.

JAMES H. SHERTS.